United States Patent
Ziegler et al.

(10) Patent No.: US 9,034,981 B2
(45) Date of Patent: May 19, 2015

(54) AQUEOUS POLYURETHANE DISPERSION

(75) Inventors: Göran Ziegler, Viken (SE); David James, Hässleholm (SE); Kent Sörensen, Perstorp (SE)

(73) Assignee: PERSTORP CHEMICALS AB, Perstorp (SE)

( * ) Notice: Subject to any disclaimer, the term of this patent is extended or adjusted under 35 U.S.C. 154(b) by 2367 days.

(21) Appl. No.: 11/909,606

(22) PCT Filed: Mar. 16, 2006

(86) PCT No.: PCT/SE2006/000334
§ 371 (c)(1),
(2), (4) Date: May 7, 2010

(87) PCT Pub. No.: WO2006/101433
PCT Pub. Date: Sep. 28, 2006

(65) Prior Publication Data
US 2010/0222448 A1    Sep. 2, 2010

(30) Foreign Application Priority Data

Mar. 23, 2005 (SE) ...................................... 0500689

(51) Int. Cl.
| | |
|---|---|
| C08F 2/46 | (2006.01) |
| C08L 75/04 | (2006.01) |
| C08G 18/67 | (2006.01) |
| C08G 18/08 | (2006.01) |
| C08G 18/12 | (2006.01) |
| C08G 18/44 | (2006.01) |
| C09D 175/16 | (2006.01) |

(52) U.S. Cl.
CPC .......... *C08G 18/672* (2013.01); *C08G 18/0823* (2013.01); *C08G 18/12* (2013.01); *C08G 18/44* (2013.01); *C09D 175/16* (2013.01)

(58) Field of Classification Search
None
See application file for complete search history.

(56) References Cited

U.S. PATENT DOCUMENTS

| | | | |
|---|---|---|---|
| 5,656,713 A | 8/1997 | Sarpeshkar et al. | |
| 6,207,744 B1 * | 3/2001 | Paulus et al. | 524/507 |
| 6,610,779 B1 | 8/2003 | Blum et al. | |

FOREIGN PATENT DOCUMENTS

| | | |
|---|---|---|
| EP | 0704469 | 4/1996 |
| WO | 0129108 | 4/2001 |

OTHER PUBLICATIONS

PCT International Search Report.

* cited by examiner

*Primary Examiner* — Randy Gulakowski
*Assistant Examiner* — Jeffrey Washville
(74) *Attorney, Agent, or Firm* — Novak Druce Connolly Bove+Quigg LLP

(57) ABSTRACT

Disclosed is an aqueous polyurethane dispersion obtained by dispersing in water a reaction product obtained by reacting a reaction mixture comprising at least one organic, aliphatic, cycloaliphatic or aromatic di, tri or poryisocyanate, at least one isocyanate reactive polycarbonate diol, triol or polyol, at least one compound comprising at least one isocyanate reactive group and at least one free radically polymerizable unsaturated group, and at least one compound comprising at least one isocyanate reactive group and at least one at least dispersing active group, and optionally at least one compound comprising at least two isocyanate reactive groups and having a molecular weight of less than 1000 g/mol.

16 Claims, No Drawings

AQUEOUS POLYURETHANE DISPERSION

CROSS-REFERENCE TO RELATED APPLICATIONS

This application is the U.S. National Stage of International Application No. PCT/SE2006/000334, filed 16 Mar. 2006, claiming benefit of Swedish patent application 0500689-5, filed 23 Mar. 2005.

The present invention relates to an aqueous polyurethane dispersion based on isocyanates, isocyanate reactive polycarbonate diols, triols and/or polyols and unsaturated compounds. The invention further relates to a composition, such as a coating or moulding, comprising said polyurethane dispersion and to the use of said polyurethane dispersion.

Water emulsifiable or dispersible polyurethanes, such as radiation curable polyurethanes, are known from and disclosed in for example U.S. Pat. No. 5,905,113, European patent applications EP 0 801 092 and EP 0 704 469. They are in general obtainable by reacting a mixture of a chain extender, such as a component containing at least two hydroxyl groups or at least two $NH_2$ groups, at least one compound containing dispersing active groups, that is non-ionic, ionic or ionisable groups, and containing an isocyanate reactive group, and at least one hydroxyalkyl ester of an ethylenically unsaturated carboxylic acid, especially hydroxyethyl acrylate, with a compound containing at least two isocyanate groups. Bifunctional compounds containing two hydroxyl groups that are frequently used are hydroxy-functional polyesters or polyethers. Unsatisfactory weather stability are, however, when using hydroxyfunctional polyethers obtained. Polyurethanes containing polyester structures are unstable to hydrolysis and therefore unsuited for weather stable coatings. Moreover, the surface tack of obtained coatings is high. The use of polycaprolactones leads to improved weather stability.

Aqueous polyurethane dispersions are used predominantly for coating of wood, leather and paper in interior applications. The use of radiation curable coatings in exterior applications is still problematic, since aqueous dispersions in particular do not have the desired weather and chemical stability.

U.S. Pat. No. 5,859,135 discloses aqueous dispersions of polymers containing functional crosslinkable groups and having lipophilic main chains, based in particular on polyesters. Owing to the high molecular weight of the disclosed lipophilic main chains, however, the crosslinking densities achieved are inadequate for good scratch resistance and chemical stability. European patent applications EP 0 026 313 and EP 0 554 784 disclose aqueous polyurethane dispersions and their use in coating compositions. The presence of sulphonic acid groups and/or sulphonate groups gives these polyurethanes a high hydrophilicity, leading to coatings exhibiting inadequate wet strength.

Polyurethanes containing carboxylic acid groups as dispersing active component have also to date been unsatisfactory in their performance properties. For instance, polyurethane dispersions as disclosed in European patent applications EP 0 392 352, EP 0 181 486 and EP 0 209 684 exhibit disadvantages in terms of chemical resistance and mechanical properties, such as hardness, elasticity and flexibility of coatings.

Water emulsifiable or dispersible radiation curable polyurethanes are also known from European patent application EP 0 704 469. The polyurethanes are composed of organic polyisocyanates, polyester polyols, compounds containing at least one isocyanate reactive group and at least one carboxyl or carboxylate group, compounds containing at least one isocyanate reactive group and at least one copolymerisable unsaturated group and further components if desired. These polyurethanes represent an improvement in terms of wet strength, chemical resistance and mechanical properties of coatings produced therefrom. There is, however, a further need for improvements, especially with regard to weather stability, chemical stability, scratch resistance, flexibility and other mechanical properties.

Unlike polyesters and polyethers polycarbonate polyols offer outstanding resistance to hydrolysis thus making polycarbonate polyols particularly suitable for production of articles having a long useful life. The resistance to heat and hydrolysis of polycarbonate polyols has in Japanese patent application JP 2003-246830 been demonstrated in hot melt urethane adhesives. To the present date only polycarbonate diols based on 1,6-hexanediol have had any real technical and commercial significance.

It is an object of the present invention to provide a polyurethane dispersion resulting in for instance coatings having good weather stability and good chemical resistance and therefore being suitable for exterior applications. A further object of the present invention is to provide a polyurethane comprising composition, such as a decorative and/or protective coating.

It has quite unexpectedly been found that above objects can be achieved by means of an aqueous polyurethane dispersion obtainable by subjecting a mixture comprising
  a) at least one organic aliphatic, cycloaliphatic or aromatic di, tri or polyisocyanate,
  b) at least one isocyanate reactive polycarbonate diol, triol or polyol,
  c) at least one compound having at least one isocyanate reactive group and at least one free radically polymerisable unsaturated group, and
  d) at least one compound having at least one isocyanate reactive group and at least one dispersing active group, and optionally
  e) at least one compound having at least two isocyanate reactive groups and a molecular weight of at most 1000 g/mol, preferably at most 500 g/mol.

to reaction and by dispersing or emulsifying obtained reaction product in water.

Said di, tri or polyisocyanate is in embodiments of the present invention any suitable isocyanate or combination of isocyanates including isomers or isomer mixtures of aliphatic, cycloaliphatic and aromatic isocyanates having at least two symmetrically or asymmetrically arranged isocyanate groups per molecule. The most preferred isocyanates are diisocyanates. Examples of aromatic diisocyanates that may be used include toluene diisocyanate, diphenylmethane diisocyanate, xylylene diisocyanate and phenylene diisocyanate. Of particular suitability is the use of aliphatic or cycloaliphatic diisocyanates, as they have a very low yellowing tendency, thus being well suited for the use in for instance coating materials. Examples of cycloaliphatic diisocyanates are isophorone diisocyanate, cyclopentylene diisocyanate, hydrogenated products of aromatic diisocyanates, such as cyclohexylene diisocyanate, methylcyclohexylene diisocyanate and dicyclohexylmethane diisocyanate. Aliphatic diisocyanates are suitably exemplified by trimethylene diisocyanate, tetramethylene diisocyanate, pentamethylene diisocyanate and hexamethylene diisocyanate. The most preferred diisocyanates are isophorone diisocyanate and dicyclohexylmethane diisocyanate.

Polycarbonate diols, triols and polyols used in the polyurethane of the present invention are for example prepared from non-vicinal diols, triols and polyols by reaction with diarylcarbonates, dialkylcarbonates, dioxolanones, phosgene, bischlorocarbonic acid esters or urea. Polycarbonate diols, triols and polyols are outlined in Polymer Reviews 9 *"Chemistry and Physics of Polycarbonates,"* pp. 9-20, 1964. Said polycarbonate diols, triols and polyols can, furthermore, be produced using for instance the transesterification process for production of polycarbonate polyols disclosed in U.S. Pat. No. 5,171,830. Polycarbonate diols, triols and polyols used in the polyurethane of the present invention are, however, not limited to species prepared using said processes.

Many diols, triols and polyols can be used in the production of polycarbonate diols, triols and polyols, such as 2,2-dialkyl-1,3-propanediols, 2-alkyl-2-hydroxyalkyl-1,3-propanediols and/or 2,2-dihydroxyalkyl-1,3-propanediols. Examples of suitable diols, triols and polyols include, but are not limited to, 1,4-butanediol, 1,5-pentanediol, 3-methyl-1,5-pentanediol, neopentyl glycol, 2-butyl-2-ethyl-1,3-propanediol, diethylene glycol, 1,6-hexanediol, triethylene glycol, 1,3-dimethanol-cyclohexane, 1,4-dimethanol-cyclohexane, 1,3-dimethanolbenzene, 1,4-dimethanolbenzene, bis-hydroxyethyl bisphenol A, dimethanoltricyclodecane, trimethylolethane, trimethylolpropane, pentaerythritol, ditrimethylolethane, ditrimethylolpropane, dipentaerythritol, anhydroenneaheptitol, 1,4-butanediol-2, bis-hydroxyethyl-hydroquinone and dendritic polyester and/or polyether polyols. Further suitable diols, triols and polyols include alkoxylated, such as ethoxylated and/or propoxylated, species of for instance neopentyl glycol, 2-butyl-2-ethyl-1,3-propanediol, trimethylolethane, trimethylolpropane, pentaerythritol, ditrimethylolethane, ditrimethylolpropane and dipentaerythritol. Mixtures of polyols can be used, and mixtures are often preferred when physical property modifications, such as reduced crystallinity or a lower melting point is desired.

Polyether diols, such as polyethylene glycol and polypropylene glycol, and polyester diols and polyols, such as polyethylene glycol adipate, and dendritic and branched polyols are also suitable hydroxyfunctional compounds. Block copolymers of polyethers or polyesters, and polycarbonates can be prepared using these diols, triols and polyols as starting materials in the trans esterification process.

Said at least one compound comprising at least one isocyanate reactive group and at least one free radically polymerisable unsaturated group is in embodiments of the present invention suitably an ester of a monoethylenically unsaturated $C_3$-$C_6$ monocarboxylic acids, preferably an ester of acrylic or methacrylic acid with a diol, triol or polyol, in which ester at least one hydroxyl group remains unesterified. Preference is given to $C_2$-$C_{12}$ hydroxyalkyl(meth)acrylates, especially $C_2$-$C_6$ hydroxyalkyl(meth)acrylates, wherein the alkyl chains are linear or branched. Said diol, triol or polyol is suitably selected from the group consisting of 2,2-dialkyl-1,3-propanediols, 2-alkyl-2-hydroxyalkyl-1,3-propanediols and 2,2-dihydroxy-alkyl-1,3-propanediols. Suitable diols, triols and polyols can be exemplified by 1,4-butanediol, neopentyl glycol, 2-butyl-2-ethyl-1,3-propanediol, diethylene glycol, 1,6-hexanediol, triethylene glycol, 1,3-dimethanol-cyclohexane, 1,4-dimethanol-cyclohexane, 1,3-dimethanolbenzene, 1,4-dimethanolbenzene, bis-hydroxyethyl bisphenol A, dimethanoltricyclodecane, trimethylolethane, trimethylolpropane, pentaerythritol, ditrimethylolethane, ditrimethylolpropane, dipentaerythritol, anhydroenneaheptitol, 1,4-butanediol-2, bis-hydroxyethyl-hydroquinone bisphenol A, bisphenol F and/or a dendritic polyester and/or polyether polyol. Said at least one compound comprising at least one isocyanate reactive group and at least one free radically polymerisable unsaturated group can in these embodiments of the present invention suitably be exemplified by hydroxyethyl (meth)acrylate, hydroxypropyl(meth)acrylate, hydroxybutyl (meth)acrylate, trimethylolpropane di(meth)acrylate, alkylene oxide modified glycerol di(meth)acrylate, alkylene oxide modified trimethylolpropane di(meth)acrylate, alkylene oxide modified pentaerythritol di or tri(meth)acrylate, ditrimethylolpropane di or tri(meth)acrylate and/or dipentaerythritol penta(meth)acrylate. Said alkylene oxide is preferably ethylene oxide and/or propylene oxide.

said at least one compound comprising at least one isocyanate reactive group and at least one free radically polymerisable unsaturated group is in further embodiments of the present invention advantageously a hydroxy or hydroxyalkyl vinylether, such as hydroxyethyl vinyl ether, hydroxybutyl vinyl ether and/or cyclohexanedimethanol monovinyl ether.

Said at least one compound comprising at least one isocyanate reactive group and at least one free radically polymerisable unsaturated group is in yet further embodiments of the present invention suitably an allyl or methallyl ether of a diol, triol or polyol, which ether has at least one unetherified hydroxyl group. Said allyl or methallyl ether can be exemplified by mono and di(meth)allyl ethers of glycerol, trimethylolethane and trimethylolpropane, mono, di and tri(meth)allyl ethers of pentaerythriol, ditrimethylolethane and ditrimethylolpropane and/or mono, di, tri, tetra and penta(meth)allyl ethers of dipentaerythritol.

Particularly preferred compound comprising at least one isocyanate reactive group and at least one free radically polymerisable unsaturated group include hydroxyalkyl(meth) acrylates, such as hydroxyethyl, hydroxypropyl and hydroxybutyl(meth)acrylate, pentaerythritol tri(meth)acrylate, trimethylolpropane di(meth)acrylate and hydroxyethyl vinylethers, such as hydroxybutyl vinyl ether and cyclohexanedimethanol monovinyl ether.

Said at least one compound comprising at least one isocyanate reactive group and at least one at least one dispersing active group have, in embodiments of the present invention, preferably two hydrogen atoms that can react with isocyanate groups and at least one non-ionic or anionic group or at least one group that can be converted into an anionic group. Suitable groups that react with isocyanate groups are in particular hydroxyl groups and amino groups. Groups capable of forming anions are carboxyl, sulphonic acid and/or phosphonic acid groups. Preferred compounds comprising said at least one isocyanate reactive group and said at least one dispersing active group are dihydroxyalkanoic acids, for example dihydroxypropionic acid, dihydroxysuccinic acid and dihydroxybenzoic acid. Particularly preferred are α,α-dimethylolalkanoic acids of general formula R—C(CH$_2$OH)$_2$—COOH, wherein R is hydrogen or an alkyl group having for instance 1-20 carbon atoms. Examples of such compounds include 2,2-dimethylolacetic acid, 2,2-dimethylolpropionic acid, 2,2-dimethylolbutyric acid and 2,2-dimethylolpentanoic acid.

Said at least one compound comprising at least one isocyanate reactive group and at least one dispersing active group are in further embodiments of the present invention suitably a non-ionic hydrophilic compound having at least one isocyanate reactive group. Such compound includes for example molecules having incorporated polyalkylene oxide, such as polyethylene oxide units. These non-ionic dispersing agents are preferably used in combination with anionic compounds as disclosed above.

Polyurethanes are, by virtue of said compound comprising at least one isocyanate reactive group and at least one at least one dispersing active group, emulsifiable or dispersible in for instance water without necessary use of emulsifying or dispersing auxiliaries, such as protective colloids or emulsifiers. Prior to or during emulsification or dispersion in water, the carboxyl groups and/or sulphonic acid groups may be neutralised using organic and/or inorganic bases, such as alkali metal hydroxides, carbonates and hydrogen carbonates, ammonia or primary, secondary or preferably tertiary amines, such as triethylamine. Compounds suitable as said optional at least one compound comprising at least two isocyanate reactive groups and having a molecular weight of less than 1000 g/mol include low molecular weight compounds with terminal isocyanate reactive groups, such as diols, triols and polyols as well as di, tri and polyamines. Examples of low molecular weight diols, triols and polyols are di, tri and polyhydric alcohols with for example 1-20 carbon atoms in the molecule, such as 2,2-dialkyl-1,3-propanediols, 2-alkyl-2-hydroxyalkyl-1,3-propanediols and/or 2,2-dihydroxyalkyl-1,3-propanediols. Examples of suitable diols, triols and polyols include, but are not limited to, ethylene glycol, diethylene glycol, triethylene glycol, 1,2-propanediol, 1,3-propanediol, 1,4-butanediol, neopentyl glycol, 2-butyl-2-ethyl-1,3-propanediol, diethylene glycol, 1,6-hexanediol, triethylene glycol, 1,3-dimethanol-cyclohexane, 1,4-dimethanol-cyclohexane, 1,3-dimethanolbenzene, 1,4-dimethanolbenzene, bis-hydroxyethyl bisphenol A, dimethanoltricyclodecane, trimethylolethane, trimethylolpropane, pentaerythritol, ditrimethylolethane, ditrimethylolpropane, dipentaerythritol, anhydroenneaheptitol, 1,4-butanediol-2, bis-hydroxyethyl-hydroquinone, bisphenol A, bisphenol F and dendritic polyester and/or polyether polyols. Examples of low molecular weight di, tri and polyamines are for instance alkylene di, tri and polyamines with 1-30, such as 2-12, carbon atoms. Preferred di, tri and polyamines are those having a linear or branched aliphatic, cycloaliphatic or aromatic structure and at least two primary amino groups. Suitable di, tri and polyamines can be exemplified by ethylenediamine, propylenediamine, 1,4-butylenediamine, piperazine, 1,4-cyclohexyldimethylamine, hexamethylenediamine, isophorone diamine, 4,4'-diamino-dicyclohexylmethane, 4,4'-diamino-3,3'-dimethyldicyclohexylmethane, diethylenetriamine, triethylenetetramine, dipropylenetriamine, tripropylenetetramine and dibutylenetriamine. Further suitable amines include hydrazines and substituted hydrazides.

The molar ratio of isocyanate groups to the isocyanate reactive groups in the reaction mixture of the present invention is preferably between 1:0.8 and 1:1.2, with particular preference at a molar ratio of approx. 1:1.

The aqueous polyurethane dispersion of the present invention is suitably prepared by reacting included components and dispersing or emulsifying obtained product in water. The course of reaction may be monitored by the consumption of functional groups, especially isocyanate groups. The reaction is preferably conducted in an inert, water miscible or soluble solvent, such as acetone, tetrahydrofuran, methyl ethyl ketone and/or N-methylpyrrolidone. The reaction temperature is typically and preferably 20-100° C., such as 50-80° C. The reaction of the isocyanates may be accelerated using at least one customary catalyst, such as dibutyltin dilaurate, tin(II) octoate or diazabicyclo[2.2]octane. If desired, any low boiling solvent may then be removed by distillation.

Any anionic groups in obtained reaction product are suitably and preferably converted to salt groups using a base, such as an amine or ammonia prior to or when dispersing or emulsifying obtained polyurethane in water. Suitable amines are primary, secondary or tertiary amines. Examples of such amines include trialkylamines, N-alkylmorpholines, N-dialkylalkanolamines and dialkyl amines. Mixtures of amines can of course also be used. Suitably, between 30 and 100% of said anionic/acidic groups are converted into salt groups. The neutralised reaction product is dispersed or emulsified in water either by adding the mixture to the water under agitation or, preferably, by the addition of water to the reaction product, going through the phase of an water-in-oil emulsion, after which it changes into an oil-in-water emulsion resulting in a finished polyurethane dispersion.

In a further aspect, the present invention refers a composition, such as a moulding or a coating, comprising at least one polyurethane dispersion as disclosed above. Said composition may furthermore comprise additives, such as photoinitiators, free radical initiators, curing accelerators, flow and levelling agents, pigments, dyes, fillers and other customary moulding and/or coating auxiliaries.

Said composition is preferably a radiation curing decorative and/or protective coating. Radiation curing takes place by exposure to high-energy radiation, such as ultraviolet (UV) radiation with a wavelength of for instance 250-600 nm, or by bombardment with high-energy electron beams (EB) at for instance 150-300 keV. Examples of radiation sources used are high-pressure mercury vapour lamps, lasers, pulsed lamps (flashlight), halogen lamps and excimer emitters. The radiation dose commonly sufficient for crosslinking in the case of UV curing is in the range of 80-3000 mJ/cm$^2$. After radiation curing, the coating of the present invention possesses very good weather stability, chemical stability, scratch resistance, hardness, tensile strength, elasticity, flexibility and adhesion.

Suitable photoinitiators for said radiation curing decorative and/or protective coating can be exemplified by benzoin and benzoin derivatives, such as benzoin methyl ether, benzoin ethyl ether, benzoin isopropyl ether, benzoin phenyl ether and benzoin acetate, acetophenones, such as acetophenone, 2,2-dimethoxyacetophenone, 4-(phenylthio)acetophenone and 1,1-dichloroacetophenone, benzil and benzil ketals, such as benzil dimethyl ketal and benzil diethyl ketal, anthraquinones, such as 2-methylanthraquinone, 2-ethylanthraquinone, 2-tertbutylanthraquinone, 1-chloroanthraquinone and 2-amylanthraquinone, triphenylphosphine, benzoylphosphine oxides, such as 2,4,6-trimethylbenzoyl-diphenylphosphine oxide, benzophenones, such as benzophenone, dimethoxybenzophenone, diphenoxybenzophenone and 4,4'-bis(N,N'-dimethylamino)benzophenone, thioxanthones and xanthones, acridine derivatives, phenazene derivatives, quinoxaline derivatives, I-phenyl-1,2-propanedione-2-O-benzoyloxime, I-aminophenyl ketones and 1-hydroxyphenyl ketones, such as 1-hydroxycyclohexylphenyl ketone, phenyl(1-hydroxyisopropyl)ketone and 4-isopropylphenyl-(1-hydroxyisopropyl)ketone, and triazine compounds, such as, 4'''-methyl-thiophenyl-1-di(trichloromethyl)-3,5-S-triazine, S-triazine-2-(stilbene)-4,6-bistrichloromethyl and paramethoxy styryl triazine.

The decorative and/or protective coating of the present invention can also be crosslinked thermally by addition of initiators forming free radicals at elevated temperatures. Use may be made, for example, of dibenzoyl peroxide, cumene hydroperoxide or azodiisobutyronitrile.

The polyurethane dispersion and thus said coating composition of the present invention is particularly suitable for decorative and/or protective coating of substrates such as wood, paper, textile, leather, non-woven, plastics, glass, ceramic, mineral building materials, such as shaped cement products and fibre cement slabs, and metals or coated metals.

Without further elaboration, it is believed that one skilled in the art can, using the preceding description, utilise the present invention to its fullest extent. The following preferred specific embodiments are, therefore, to be construed as merely illustrative and not limitative of the remainder of the disclosure in any way whatsoever. In the following Examples 1 and 2 refer to synthesis of polycarbonate diols used in embodiments of the polyurethane dispersion of present invention and Examples 3 and 4 to preparation of acrylic polyurethane dispersions based on the polycarbonate diols of Example 1 and 2. Examples 5 and 6 are comparative examples wherein acrylic polyurethane dispersion based on polyester and polyether polyols are prepared. Example 7 shows coating compositions comprising the polyurethane dispersions obtained in Examples 3-6.

EXAMPLE 1

The synthesis is performed in two steps, a transcarbonylation step at atmospheric pressure followed by a polymerisation step at a reduced pressure. The transcarbonylation, by which dimethylcarbonate (DMC) forms the mono and dimethylcarbonate esters of neopentyl glycol, is performed to avoid losses of DMC in the polymerisation step due to the azeotrop formed with methanol. The synthesis gave a yield of more than 90% polycarbonate of neopentyl glycol, which product was a white solid with melting range of 100-110° C. and a hydroxyl value of 112 mg KOH/g.

Step 1: 169 g (1.88 mole) of DMC and 140 g (1.34 mole) of neopentyl glycol were charged to a 500 ml glass reactor provided with heating and stirring. 1.07 g (0.013 mole) of NaOH (50% in water) was slowly added drop wise when the neopentyl glycol began to go into solution. The mixture was set to reflux at a starting temperature of 94° C. Formed methanol and remaining DMC were distilled of under atmospheric pressure when the temperature reached 81° C. The distillation temperature interval was 82-124° C.

Step 2: In this polymerisation step the pressure was during 25 minutes reduced to 7 mbar and the reaction was completed by maintaining said pressure for 60 minutes at 120° C.

EXAMPLE 2

The synthesis is performed in two steps, a transcarbonylation step at atmospheric pressure followed by a polymerisation step at a reduced pressure. The transcarbonylation, by which dimethylcarbonate (DMC) forms the mono and dimethylcarbonate esters of 2-butyl-2-ethyl-1,3-propanediol (BEPD), is performed to avoid losses of DMC in the polymerisation step due to the azeotrop formed with methanol. The synthesis gave a yield of more than 90% polycarbonate of BEPD, which product was liquid at room temperature with a hydroxyl value of 112 mg KOH/g.

Step 1: 126.1 g (1.4 mole) of DMC and 162.25 g (1.34 mole) of BEPD were charged to a 500 ml glass reactor provided with heating and stirring. 0.04 g (0.0005 mole) of NaOH (50% in water) was slowly added drop wise when the neopentyl glycol began to go into solution. The mixture was set to reflux at a starting temperature of 99° C. Formed methanol and remaining DMC were distilled of under atmospheric pressure when the temperature reached 81° C.

Step 2: In this polymerisation step the pressure was during 25 minutes reduced to 15 mbar and the reaction was completed by maintaining said pressure for 270 minutes at 120° C.

EXAMPLE 3

100 g of the polycarbonate diol of Example 1, 11.5 g of dimethylol propionic acid, 11.3 g of N-methyl pyrrolidinone, 3.2 g of dibutyl tin laurate, 13.3 g of 2-hydroxyethyl acrylate and 7.7 g of trimethylolpropane were charge to a five necked reaction flask, fitted with a stirrer, a thermometer, nitrogen purge and a reflux condenser. Charged raw materials were mixed at 60° C. and 88.9 g of isophorone diisocyanate was subsequently added drop wise over a period of 2 hrs. The resulting mixture was then during 3-4 hours heated under stirring to 75° C. until formation of an NCO-containing resin (2.6% by weight of NCO). 7.8 g of triethyl amine was at 60° C. added and mixed for 30 minutes. 7.7 g of ethylene diamine was at 40-50° C. and under stirring added to the neutralised reaction mixture over a period of 5 min. 460 g of de-ionized water was finally added to the reaction product to form a polyurethane dispersion. The solids content of the dispersion was 35% by weight and the particle size<100 nm.

EXAMPLE 4

Example 3 was repeated with the difference that the polycarbonate diol of Example 2 was used instead of the polycarbonate diol of Example 1.

EXAMPLE 5

Comparative

Example 3 was repeated with the difference that neopentyl glycol adipate was used instead of the polycarbonate diol of Example 1.

EXAMPLE 6

Comparative

Example 3 was repeated with the difference that polytetramethylene ether glycol (Terathane™ 1000 from Dupont) was used instead of the polycarbonate diol of Example 1.

EXAMPLE 7

The polyurethane dispersions of Examples 3-6 (Samples 3-6) were mixed with 2.5% by weight of Darocur® 1173 (photoinitiator, CIBA) and coated on steel panels at a wet film thickness of 90 μm. The coatings were flashed at 80° C. for 10 minutes before curing. Curing was performed by allowing the coated panels to pass 5 times under a 80 W/cm UV H bulb at a speed of 10 m/min.

The weathering stability was determined by exposing the samples to UV/water cycles of 8 hours irradiation at 80° C. and 4 hours dark condensation at 50° C. in a QUV Weather-o-Meter UVA-A-340 with fluorescent lamps. After 300 hours Sample 5 was found to have been subjected to hydrolysis and Sample 6 to UV degradation at a much higher degree than was found for Samples 2 and 3.

The invention claimed is:
1. An aqueous polyurethane dispersion obtained by subjecting a mixture comprising:
  a) at least one organic, aliphatic, cycloaliphatic or aromatic di, tri or polyisocyanate,
  b) at least one isocyanate reactive polycarbonate diol, triol or polyol obtained by reaction between an alkyl carbonate and 2,2-dialkyl-1,3-propanediol, a 2-alkyl-2-hydroxyalkyl-1,3-propanediol or a 2,2-dihydroxyalkyl-1,3propanediol,
  c) at least one linear or branched $C_2$-$C_{12}$ hydroxyalkyl (meth)acrylate,
  d) at least one dihydroxyalkanoic acid, and optionally,
  e) at least one isocyanate reactive 2,2-dialkyl-1,3-propanediol, 2-alkyl-2-hydroxyalkyl-1,3-propanediol or 2,2-dihydroxyalkyl-1,3propanediol, to reaction subsequent conversion of at least 30% of anionic groups present in obtained reaction product to salt groups by addition of at least base and dispersion in water, said components (a) through (e) being subjected to reaction at a molar ratio isocyanate groups to isocyanate reactive groups of between 1:0.8 and 1:1.2 and said reaction being performed at a temperature of between 20° and 100° C. in presence of at least one catalyst and at least one inert, water miscible solvent.

2. A polyurethane dispersion according to claim 1, wherein said molar ratio isocyanate groups to isocyanate reactive groups is 1:1.

3. A polyurethane dispersion according to claim 1, wherein said reaction temperature is between 50° C. and 80° C.

4. A polyurethane dispersion according to claim 1, wherein said di, tri or polyisocyanate (a) is an aromatic diisocyanate selected from the group consisting of toluene diisocyanate, diphenylmethane diisocyanate, xylylene diisocyanate and phenylene diisocyanate.

5. A polyurethane dispersion according to claim 1, wherein said at least one di, tri or polyisocyanate (a) is an cycloaliphatic diisocyanate selected from the group consisting of isophorone diisocyanate, cyclopentylene diisocyanate, cyclohexylene diisocyanate, methylcyclohexylene diisocyanate and dicyclohexylmethane diisocyanate.

6. A polyurethane dispersion according to claim 1, wherein said di, tri or polyisocyanate (a) is an aliphatic diisocyanate selected from the group consisting of trimethylene diisocyanate, tetramethylene diisocyanate, pentamethylene diisocyanate, and hexamethylene diisocyanate.

7. A polyurethane dispersion according to claim 1, wherein said alkyl carbonate is dimethyl carbonate or diethyl carbonate.

8. A polyurethane dispersion according to claim 1, wherein said 2,2-dialkyl-1,3-propanediol, a 2-alkyl-2-hydroxyalkyl-1,3-propoanediol or a 2,2-dihydroxyalkyl-1,3-propanediol is neopentyl glycol, 2-butyl-2-ethyl-1,3-propanediol, trimethylolethane or pentaerythritol.

9. A polyurethane dispersion according to claim 1, wherein said polycarbonate diol, triol or polyol (b) is obtrained by reaction between dimethyl or diethyl carbonate and neopentyl glycol or 2-butyl-2-ethyl-1,3-propanediol.

10. A polyurethane dispersion according to claim 1, wherein said at least one hydroxyalkyl (meth)acrylate (c) is hydroxyethyl (meth)acrylate, hydroxypropyl (meth)acrylate or hydroxybutyl (meth)acrylate.

11. A polyurethane dispersion according to claim 1, wherein said dihydroxyalkanoic acid (d) is dihydroxypropionic acid, dihdroxysuccinic acid, dihydroxbenzoic acid, 2,2-dimethylolacetic acid, 2,2-dimethylolpropionic acid, 2,2-dimethylolbutyric acid or 2,2-dimentylolpentanoic acid.

12. A polyurethane dispersions according to claim 1, wherein said compound (e) is neopentyl glycol, 2-butyl-2-ethyl-1,3-propanediol, trimethylolethane or pentaerythritol.

13. A polyurethane dispersion according to claim 1, wherein said base is a primary, secondary or tertiary amine.

14. A polyurethane dispersion according to claim 13, wherein said amine is a trialkylamine, a N-alkylmorpholine, a N-dialkylalkanolamine or a dialkyl amine.

15. A polyurethane dispersion according to claim 1, wherein said catalyst is dibutyltin dilaurate, tin(II)octoate or diazabicylo[2.2]octane.

16. A polyurethane dispersion according to claim 1, wherein said solvent is acetone, tetrahydrofuran, methyl ethyl ketone or N-methylpyrrolidone.

\* \* \* \* \*